United States Patent Office 3,396,194
Patented Aug. 6, 1968

3,396,194
PREPARATION OF AROMATIC SULFONYL BROMIDES VIA THE AQUEOUS BROMINATION OF AROMATIC SULFONYL HYDRAZIDES
Frank A. Magnotta, Millersville, and Algirdas C. Poshkus, Lancaster, Pa., assignors to Armstrong Cork Company, Lancaster, Pa., a corporation of Pennsylvania
No Drawing. Filed Sept. 19, 1963, Ser. No. 310,137
6 Claims. (Cl. 260—543)

This invention relates to the preparation of aromatic sulfonyl bromides from sulfonylhydrazides.

There exists a variet yof methods for preparing sulfonyl bromides. Some of these involve bromination of compounds such as aromatic sulfinic acids or their salts, thiophenols, and sulphur-substituted thiuronium salts. Other methods use the reaction of various compounds such as phosphorus pentabromide with aromatic sulfonic acids or their salts. Such methods are tedious and laborious, and frequently involve the use of ingredients which are not readily available.

It is the primary object of the present invention to present a simple method of making aromatic sulfonyl bromides from readily available ingredients by a method which involves a simple reaction having an excellent yield.

The invention contemplates forming an aqueous strongly acidic reaction medium by mixing water, a strong mineral acid when a solution of a mixture of a bromide and a bromate is to be used as a brominating agent, and an aromatic sulfonylhydrazide. To the reaction medium is added a brominating agent. The brominating agent may be bromine or an aqueous solution of a mixture of an inorganic bromide and an inorganic bromate. During addition of the brominating agent to the reaction medium the temperature is maintained in the range of 0°–35° C., and preferably in the range 10°–20° C. The aromatic sulfonyl bromide precipitates from the reaction medium and is recovered by separating the reaction medium therefrom.

In this reaction, four equivalents of bromine are required for every hydrazyl group present. The reaction with bromine itself is

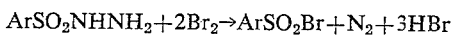

In the above equation, Ar signifies an aromatic radical, preferably benzene or toluene. The hydrobromic acid formed during the reaction supplies the acid required to drive the reaction completion. When a mixture of an inorganic bromate and an inorganic bromide is added to the acidic solution or suspension of the aromatic sulfonylhydrazide, the reaction is

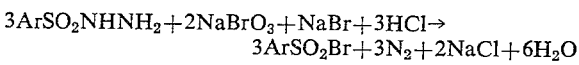

A strong mineral acid must be added since no acid is released during the reaction. One mole of acid should be present for each mole of hydrazide. Yields of the reaction generally exceed 90%.

The inorganic bromide and inorganic bromate will be the alkali metal salt or the ammonium salt.

Many of the sulfonylhydrazide starting materials of the present invention are readily available in commerce. Some of these materials serve as blowing agents for producing cellular products. For example, benzenesulfonylhydrazide, p-toluenesulfonylhydrazide, benzene-1,3-disulfonylhydrazide, 4,4′ - oxydi(benzenesulfonylhydrazide) and 3,3′-diphenylsulfonedisulfonylhydrazide are commercially available. In fact, it is one of the useful features of the present invention that the method can be used to identify qualitatively and to some extent quantitatively the presence of these sulfonylhydrazide expanding agents in rubber and resin compositions. The aromatic sulfonyl bromides serve as flame-proofing and fire-retardant additives to rubber compositions and to resins such as polystyrene.

Aromatic sulfonylhydrazides other than those mentioned above may be prepared readily by adding the corresponding sulfonyl chloride to a slight excess of hydrazine in water or in an organic solvent. The resulting precipitated hydrazide will be filtered and purified by recrystallizing from water, ethanol, or other suitable solvent. Yields from such a process are almost quantitative.

The following examples illustrate several embodiments of the invention. All parts are by weight unless otherwise stated.

EXAMPLE 1

An acidic reaction medium was prepared by dissolving 7.44 parts (0.04 mole) of p-toluenesulfonylhydrazide in 60 parts by volume of 25% hydrochloric acid in water. A solution of brominating agent was prepared by dissolving 12.4 parts sodium bromide and 6.1 parts sodium bromate in 70 parts by volume of water. The brominating agent solution was added dropwise to the acidic p-toluenesulfonylhydrazide solution with good stirring at a temperature of about 10° C. until the yellow color of bromine persisted. This required 45 parts by volume of the solution of brominating agent. The evolution of gas subsided shortly afterwards. The white solid that immediately precipitated was washed with cold water and dried. The p-toluenesulfonyl bromide product, in an amount of 8.9 parts for a 95% yield, had a melting point of 94°–96° C. After recrystallization from low boiling petroleum ether, the product melted at 95°–96° C.

EXAMPLE 2

An acidic reaction medium was prepared by dissolving 8.6 parts of benzenesulfonylhydrazide in 60 parts by volume of 25% hydrochloric acid. The brominating agent of Example 1 was used. Temperature of reaction was maintained at 5° C.

The benzenesulfonyl bromide product, in a 98% yield, was recovered in the form of an oil.

EXAMPLE 3

Tn acidic reaction medium was prepared by dissolving 5.3 parts of benzene-1,3-disulfonylhydrazide in 70 parts by volume of 25% hydrochloric acid. The brominating agent of Example 1 was used. The yield of benzene-1,3-disulfonyl bromide, melting point 53°–54° C. after recrystallization from petroleum ether, was 82%.

EXAMPLE 4

A saturated solution of bromine in water was added to a suspension of p-toluenesulfonylhydrazide in water at 20° C. until a slight excess of bromine was present. The reaction was immediate and gas was evolved. The white precipitate of p-toluenesulfonyl bromide melted at 90°–93° C. without further purification.

EXAMPLE 5

An acidic reaction medium was prepared by mixing 20 parts by volume of glacial acetic acid, 10 parts by volume water, and 20 parts by volume concentrated hydrochloric acid. To the acidic reaction medium was added 2.02 parts p-methoxybenzenesulfonylhydrazide.

A brominating agent was prepared by dissolving in 300 parts by volume of water one mole of sodium bromide and 0.2 mole sodium bromate. The brominating agent was added dropwise to the hydrazide solution and the mixture was then shaken intermittently for three-quarters of an hour. Excess bromine was then removed by the addition of a 10% solution of sodium bisulphite, followed by extracting the product with ether and working up the product. The product was recovered in an amount of 2.0 parts, the p-methoxybenzenesulfonyl bromide melting in the range 23°–26° C.

EXAMPLE 6

Into a mixture of 50 parts by volume of 20% hydrochloric acid and 20 parts by volume of concentrated hydrochloric acid was placed 5.7 parts of 4,4'-oxydi(benzenesulfonylhydrazide). A brominating agent was made by dissolving 10.3 parts of sodium bromide and 5.1 parts of sodium bromate in 70 parts by volume of water. The brominating agent was added to the reaction medium which was maintained at about 5° C. The brominating agent was added dropwise, a precipitate forming immediately. The precipitate was filtered from the solution, rinsed, and dried at 40° C. and 1 millimeter mercury pressure absolute. The product, 4,4'-oxydi(benzenesulfonyl bromide) was recovered in an amount of 6.2 parts for a yield of 81%. It had a melting point of 126°–129° C.

EXAMPLE 7

Into 100 parts by weight of 15% hydrochloric acid was placed 5 parts 3,3'-diphenylsulfonedisulfonylhydrazide. The brominating agent was prepared by dissolving in 50 parts by volume of water 3.8 parts of sodium bromide and 1.3 parts of sodium bromate.

After the usual addition and working up, 5.5 parts of dried product for an 88% yield resulted.

EXAMPLE 8

Into 10 parts by volume of 10% hydrochloric acid solution was placed 0.6 part of 2-naphthalene sulfonylhydrazide. The brominating agent was prepared by dissolving in 60 parts by volume of water 12.4 parts of sodium bromide and 6.1 parts of sodium bromate. Of this solution, 5 parts by volume of brominating agent solution was added to the reaction medium. The resulting precipitate was worked up and dried. The bromide was present in an amount of 0.40 part having a melting point in the range 88°–94° C. On the recrystallization from ligroin, the melting point was 89°–91° C. After several additional recrystallizations from ligroin, the melting point was 92°–94° C.

We claim:
1. The method of making an aromatic sulfonyl bromide comprising forming an aqueous reaction medium by mixing water, hydrochloric acid when the brominating agent is a mixture of sodium bromide and sodium bromate, and an aromatic sulfonylhydrazide in which the aromatic group is selected from the groups consisting of benzene, p-methoxybenzene, toluene, 3,3'-diphenyl, and naphthalene, adding a brominating agent selected from the group consisting of bromine and said mixture of sodium bromide and sodium bromate to said reaction medium, maintaining the temperature of the resultant mixture in the range of 0°–35° C., and recovering the aromatic sulfonyl bromide.

2. The method according to claim 1 wherein said temperature range is 10°–20° C.

3. The method according to claim 1 wherein said brominating agent comprises an aqueous solution of sodium bromide and sodium bromate.

4. The method according to claim 1 wherein said brominating agent is bromine.

5. The method according to claim 1 wherein said aromatic sulfonylhydrazide is p-toluenesulfonylhydrazide.

6. The method according to claim 1 wherein said aromatic sulfonylhydrazide is benzenesulfonylhydrazide.

References Cited

Davies, W., et al.: J. Chem. Soc. (London), The Chemical Society, 1931, pp. 624–629.

Remy, H.: Treatise on Inorganic Chemistry, Princeton, D. Van Nostrand Co., Inc., vol. 1, page 811 (1956).

LORRAINE A. WEINBERGER, *Primary Examiner.*

H. C. WEGNER, *Assistant Examiner.*